United States Patent [19]

Pontius et al.

[11] Patent Number: 4,805,803
[45] Date of Patent: Feb. 21, 1989

[54] DEVICE FOR PREPARING AND EJECTING A CHEMICALLY REACTING MIXTURE

[75] Inventors: Klaus Pontius, Hermeskeil; Manfred Settinger, Ockten, both of Fed. Rep. of Germany

[73] Assignee: Klockner Ferromatik Desma GmbH, Malterdingen, Fed. Rep. of Germany

[21] Appl. No.: 87,818

[22] Filed: Aug. 21, 1987

[30] Foreign Application Priority Data

Aug. 27, 1986 [DE] Fed. Rep. of Germany ....... 3629041

[51] Int. Cl.⁴ ............................................. B67D 5/52
[52] U.S. Cl. ........................................ 222/52; 222/137;
 222/149; 222/200; 239/116; 239/416.2;
 239/590.3; 239/590.5; 366/77; 366/194
[58] Field of Search ................... 222/52, 135, 137, 145,
 222/148-149, 200, 387, 389, 504; 239/116, 412,
 416.2, 586, 590.3, 540.5; 366/77, 96, 138, 152,
 176, 192-193, 194, 341; 422/133; 137/896

[56] References Cited

U.S. PATENT DOCUMENTS

| | | | |
|---|---|---|---|
| 3,633,489 | 1/1972 | Spoelhof et al. | 222/485 X |
| 4,342,552 | 8/1982 | Trippet | 431/183 |
| 4,442,070 | 4/1984 | Proksa et al. | 422/133 |
| 4,477,191 | 10/1984 | Ersfeld et al. | 366/77 |

FOREIGN PATENT DOCUMENTS

| | | |
|---|---|---|
| 2065841 | 11/1977 | Fed. Rep. of Germany . |
| 2847504 | 5/1980 | Fed. Rep. of Germany ...... 222/145 |
| 2327269 | 4/1981 | Fed. Rep. of Germany . |
| 3022132 | 12/1981 | Fed. Rep. of Germany . |
| 3340889 | 5/1986 | Fed. Rep. of Germany . |

*Primary Examiner*—Michael S. Huppert
*Attorney, Agent, or Firm*—Watson, Cole, Grindle & Watson

[57] ABSTRACT

A device for preparation of a chemically reacting mixture, and for ejecting the mixture into a mold includes a pair of slides having transverse through openings capable of being mismatched upon relative reciprocation, oscillation and/or vibration of the slides for dynamically setting the mixing pressure.

10 Claims, 4 Drawing Sheets

DEVICE FOR PREPARING AND EJECTING A CHEMICALLY REACTING MIXTURE

RELATED APPLICATIONS

This application relates to U.S. Ser. No. 087,786, filed Aug. 21, 1987, and to U.S. Ser. No. 087,821, filed Aug. 21, 1987, both commonly owned herewith and respectively claiming priority based on German Patent Application No. P 36 29 042.4 and P 36 29 021.1-16, both filed Aug. 27, 1986.

BACKGROUND OF THE INVENTION

This invention relates to a device for preparing a chemically reacting mixture and for ejecting the mixture into a mold cavity, the mixture comprising at least two components, in particular a mixture of isocyanate and a polyol that reacts completely to form polyurethane. The device comprises a mixing head having an outwardly open bore, and a reciprocable ram coupled to the head, the ram having an ejector rod axially movable in the bore for therewith defining a mixing chamber and for ejecting the mixture from the chamber.

The mixing head has opposed infeed nozzles for respectively injecting the isocyanate and a polyol into the bore. Mixing results from the impact of one chemical on the other. In its retracted position, the rod defines a mixing chamber with the bore and is positioned upstream of the infeed nozzles.

The degree of mixing depends on the mixing pressure, i.e., the Pressure which exists in the mixing chamber during the mixing of the components.

German Pat. No. 20 65 841 discloses a device as generally characterized above which has a baffle located at the downstream end of the mixing chamber below the inlet nozzles, the baffle being in the form of a rod reciprocable along its longitudinal axis for regulating the mixing chamber pressure depending on the extent of the projection of the baffle into the chamber. After the mixture is prepared, the baffle rod is retracted out of the bore to permit the ejector rod to axially extend through the bore for ejecting the mixture into the mold in which molded bodies of polyurethane are formed. During its reciprocation, the ejector rod cleans the bore and the mixing chamber of any remnants of the chemically reacting mixture, and is therefore known as a cleaning rod.

In published German patent application No. 30 22 132.1, a baffle is located at the downstream end of the mixing chamber below the infeed nozzles, the baffle being in the form of a cylindrical body rotatable about its central axis, and the rod having a transverse opening coaxial with the mixing head bore and chamber. In the extended position of the ejector rod, the transverse opening aligns with the mixing head bore. During preparation of the mixture upon inletting the two chemically reacting components, the barrier rod is rotated about its axis for shifting its opening a predetermined angle relative to the mixing head bore for regulating the chamber pressure.

Another similar device is disclosed in German Pat. No. 23 27 269 in which the mixing head has perpendicularly related bores from which the mixture is ejected by the ejector rod. The mixing chamber is located at the juncture of the perpendicular bores. A reciprocable bearing rod is likewise located at this juncture such that the mixture impacts against the rod before it is ejected. The angled path of the bore considerable reduces the speed at which the mixture can be ejected.

Still another device is disclosed in German Pat. No. 33 40 889 in which the mixture is divided into several partial streams downstream of the mixing chamber, some of which are accelerated and some of which are restrained and then again recombined. This is intended to effect improved mixing and a shorter retention time over the reacting mixture in the mixing head with simultaneous homogenization. In carrying out the Procedure of this known device, a pair of slides are provided rotatable about their common axis and each having transverse openings provided in the flow direction of the mixing chamber. During the mixing of the components, these openings define so-called overflow channels which effect the division of the mixture flow into accelerated and retarded partial streams as the transverse openings enclose a fixed angle relative to the axis of the mixing head bore in which the ejector rod reciprocates.

In all these known devices, the baffles or double slides are shifted to a predetermined position below the mixing chamber at the commencement of mixing in which they remain until mixing is completed, and are then returned to a position in which the ejector rod can be extended without obstruction for ejecting the reacted mixture. Subsequently, after completing the cleaning phase, the ejector rod is retracted above the mixing chamber, while the baffle or double slide is again shifted into its working position during mixing.

Thus, in these known devices, the mixing pressure is regulated in a limited manner by the specific setting of the reciprocable or rotatable baffle rods, and the size of the transverse opening thereof is set in accordance with the diameter of the mixing head bore and the mixing chamber in which the ejector rod reciprocates. Thus, a presetting of the mixing pressure for the mixture is generally not made possible by these known devices, given that the optimal production quality, the viscosity of the components as well as the viscosity of the chemically reacting mixture are temperature dependent. In addition, the viscosity changes in the presence of additives used such as swelling agents fed into the mixing chamber through other nozzles. And, the viscosity of the chemically reacting mixture changes with different mixing ratios of the components.

The average time which elapses for completion of the mixture Preparation also influences the viscosity, and as the elapsed time increases the chemical reactions recurring in the mixture are further advanced as compared with shorter elapsed times.

SUMMARY OF THE INVENTION

It is therefore an object of the present invention to provide a device for preparing a chemically reacting mixture, and for ejecting the mixture into the mold, the mixture comprising at least two components, in particular a mixture of isocyanate and a polyol that reacts completely to form polyurethane, and the device having a pair of slides with transverse bores with the slides reciprocating and/or oscillating in such a manner as to avoid the known problems of the prior art. The device assures improved mixing under optimum pressure of the mixing chamber, and assures optimum quality of the molded bodies produced for different compositions of the chemically reacting mixtures.

The slides employed for the device in carrying out the invention are reciprocated and/or oscillated relative to one another between a mixture ejecting position and mixture preparation positions, and drive means connected to the slides effect the oscillation and/or reciprocation at a predetermined frequency and/or amplitude and phase shift in accordance with a predetermined mixing pressure required for the mixture. The openings of the slides are coaxial with the bore in the mixture ejecting position to permit the ejector rod to extend therethrough. And, the openings of the slides in the mixture preparation positions are out of alignment with the bore for regulating a predetermined mixing pressure required for the mixture.

The slides may be in the form of flat bars or plates which are reciprocable, or may be in the form of telescoping cylindrical bodies which are oscillatable about the common axis thereof and/or which are reciprocable along such axis. The oscillating movement is a back-and-forth type movement, such as a pendulum movement.

During the mixing operation, the two vibrating openings in the slides delineate a through opening, the cross-section of which is cyclically constant and which is smaller than the cross-section of the mixing chamber. By setting the amplitudes, frequencies and phase position, this open cross-section is set, i.e. it is possible to experimentally predetermine the optimum pressure at which the components are to be mixed, and then adjusting the slides such that their openings are coaxial with the bore to permit the ejector rod to extend therethrough for ejecting the mixture into the mold.

The degree of oscillation of the cylindrical slides may be such as to effect torsional vibration of one or both of the slides about the central axis thereof. The homoginization of the mixture may thus be increased and the time needed for completing the mixture is considerably reduced. And, the open cross-section released cyclically by the two openings of the torsionally vibrating slides may be determined by the setting of the frequencies and/or torsional vibrations.

Other objects, advantages and novel features of the invention will become more apparent from the following detailed description of the invention when taken in conjunction with the accompanying drawings.

BRIEF DESCRIPTIONS OF THE DRAWINGS

Figures 1A, 1B:
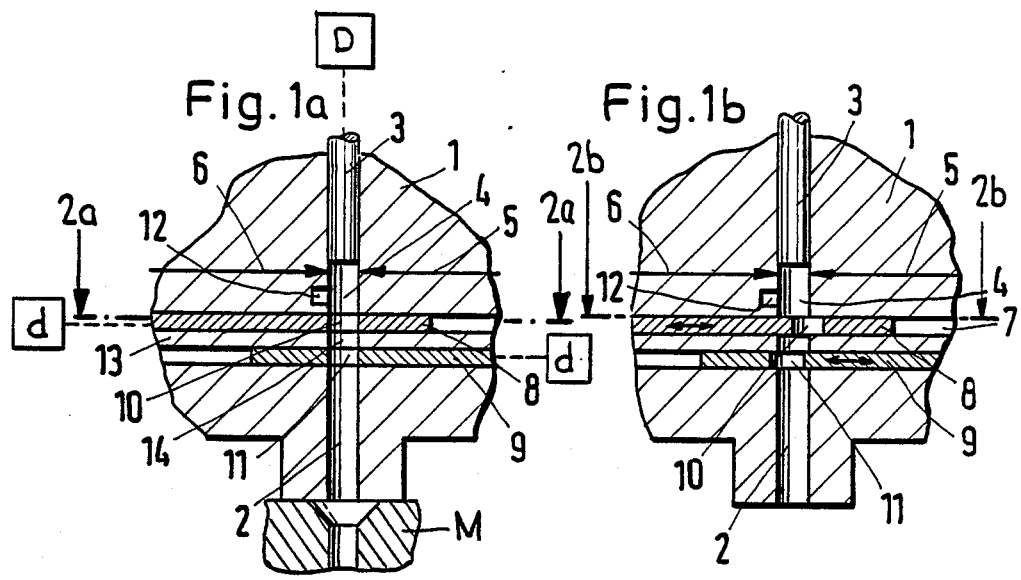
FIG. 1a is a vertical sectional view of part of the mixing head of the device according to the invention including reciprocable slides having transverse openings in alignment in the mixture ejecting position.
FIG. 1b is a view similar to FIG. 1a showing the slides shifted relative to one another in a mixture preparation position in which the transverse openings of the slides are mismatched.
Figure 2A:
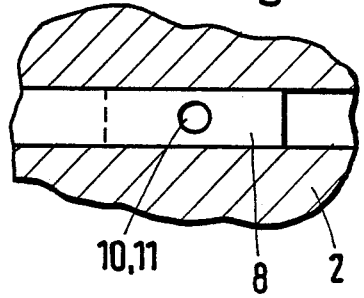
Figure 2B:
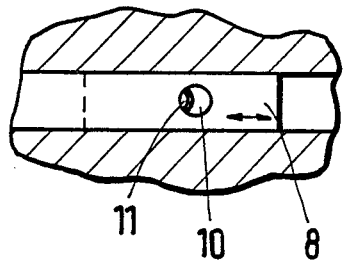
Figure 3:
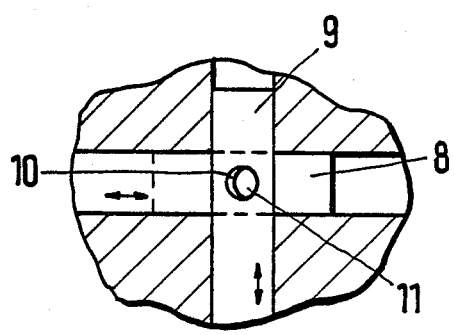
Figure 4:
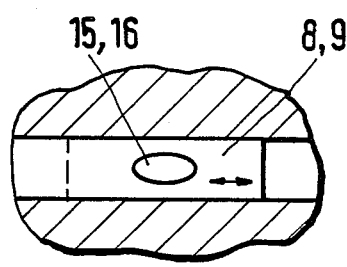
Figure 6A:
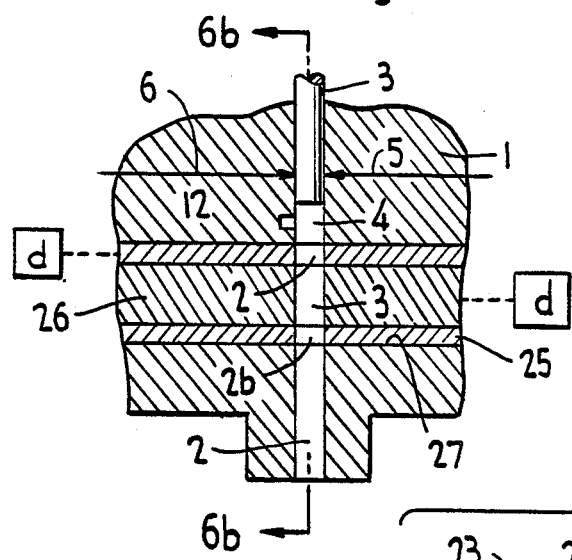
Figure 5:
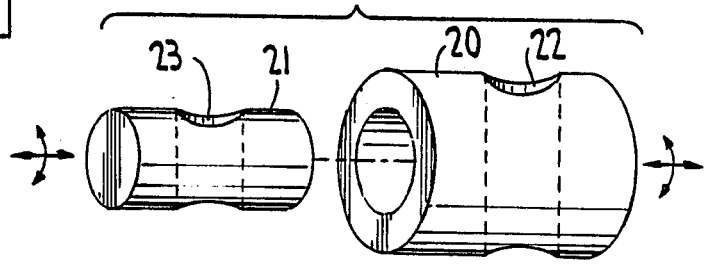
Figure 6B:
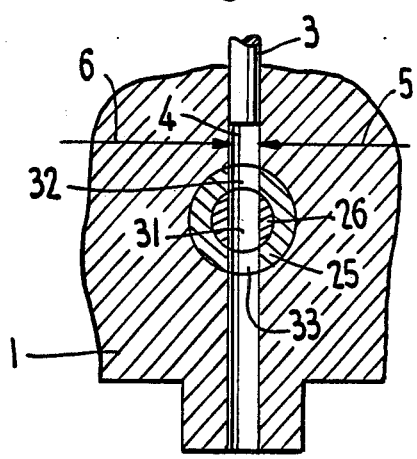
Figure 6C:
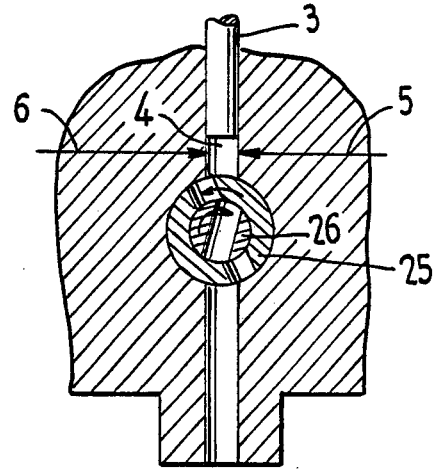
Figure 7A:
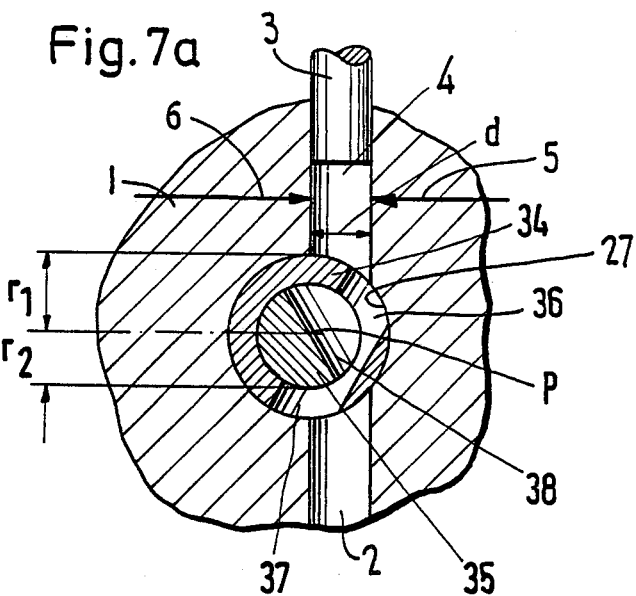
Figure 7B:
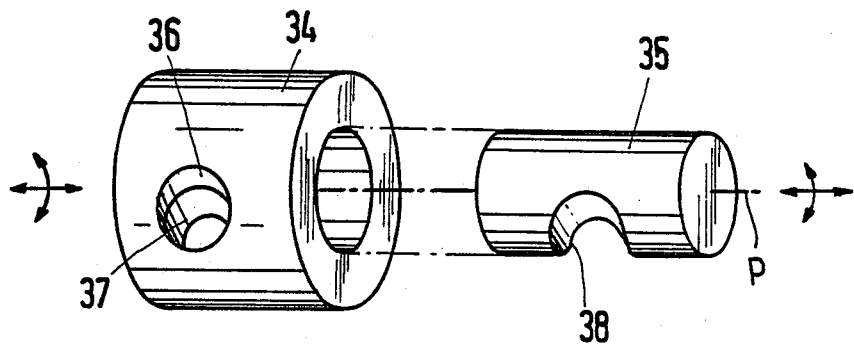
Figure 8:
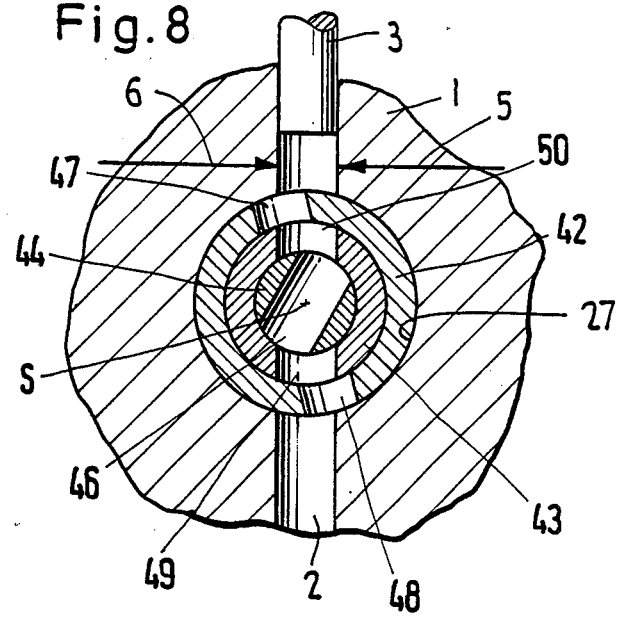
Figure 9:
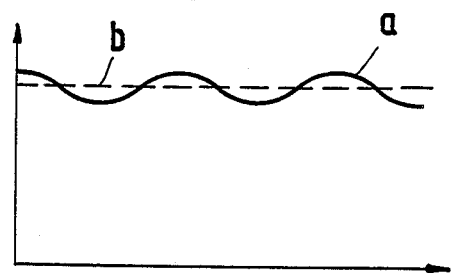

FIGS. 2a and 2b are sectional views taken substantially along the lines 2a—2a and 2b—2b, respectively, of FIGS. 1a and 1b;

FIG. 3 is a view similar to FIG. 2b of a variant according to the invention;

FIG. 4 is a view similar to FIG. 2a of another variant according to the invention;

FIG. 5 is a perspective view of telescoping cylindrical slides having oval transverse openings for carrying out the invention;

FIG. 6a is a view similar to FIG. 1a of another embodiment of the invention which includes telescoping cylindrical slides;

FIG. 6b is a view taken substantially along the line 6b—6b of FIG. 6a;

FIG. 6c is a view similar to FIG. 6b showing the telescoping cylindrical bodies relatively shifted about the common axis thereof;

FIG. 7a is a view similar to FIG. 6c of yet another embodiment of the invention;

FIG. 7b is a perspective view of the telescoping cylindrical slides of FIGS. 7a;

FIG. 8 is a view similar to FIG. 7a of yet another embodiment of the invention; and FIG. 9 is a graph showing the time lapse of the open cross-section presented by the transverse openings of the slides, and the medium value.

DETAILED DESCRIPTION OF THE INVENTION

One embodiment of the device according to the invention is shown in FIGS. 1a and 1b as comprising a mixing head 1 having an outwardly open axial bore 2, and an ejector rod 3 mounted for axial sliding movement within the bore. The rod is shown in its retracted position in FIGS. 1a and 1b, and is reciprocated pneumatically or hydraulically by a suitable ram drive D similar to that set forth in the aforementioned related applications. In this retracted position, the ejector rod defines a mixing chamber 4 together with the bore, and opposing inlet passages or nozzles 5 and 6 (schematically shown by the arrows) are located in the head just downstream of the rod in its retracted position. Quantities of isocyanate and a polyol are fed through the nozzles into the mixing chamber to form a polyurethane mixture in a manner known in the art.

In accordance with the invention, a transverse guide passage is provided in the mixing head at the downstream end of the mixing chamber, such a guide passage in the FIGS. 1a and 1b embodiment being in the form of flat open slots 7 and 7a disposed perpendicular to the axis of bore 2. Flat plates or bars 8 and 9 are respectively received in these slots, and respectively have through openings 10 and 11. In FIGS. 1a and 2a, these openings are shown in a mixture ejecting position in which their openings 10 and 11 are in alignment with bore 2 such that upon completion the mixture preparation rod 3 is extended to eject the mixture into mold M as the rod extends through aligned openings 10, 11.

Slide plates 8 and 9 are connected to suitable drives d for reciprocating the plates relative to one another in the directions of the pairs of arrows shown in FIGS. 1b and 2b. In this mixture preparation position, which is one of many such positions depending on the degree of mismatch between openings 10 and 11, the pressure to which the mixture is subjected in the mixing chamber obtains a preset value after which the slides are shifted to the FIG. 1a position such that the mixture may be ejected out of the mixing chamber by the ejector rod under the obtained pressure.

A pressure sensor 12 is provided in the wall of the mixing chamber for sensing the mixing pressure such that when the mixture obtains its preset value the slides may be shifted to the FIG. 1a position. And, in this embodiment, grooves 7 and 7a are separated by an intervening bridge 13 having a bore 14 in alignment with bore 2. However, slides 8 and 9 may be located in a common slot 7 in which they slide against one another.

In the embodiment according to FIGS. 1 and 2, slides 8 and 9 reciprocate in parallel directions, although the slides could be arranged to reciprocate in directions perpendicular to one another without departing from the invention. FIG. 3 discloses such a modified arrangement.

Generally, bore 2 and mixing chamber 4 have a circular cross-section for reasons of production, and ejector rod 3 has a complimentary circular cross-section. However, rod 3 and its bore 2 may have a cross-section other than circular, such as oval, so that openings 10 and 11 in the slides would also be of the same oval shape and size. Such modification is illustrated in FIG. 4 in which slides 8 and 9 are respectively provided with oval openings 15 and 16 of the same size and shape as the cross-section of rod 3 (not otherwise shown). With such an out-of-round cross-section, the setting of the frequencies and amplitudes of drives d may be varied for influencing the time sequence of the matching and mismatching of the slide openings.

Rather than the slides being in the form of flat plates or bars shown in FIGS. 1 to 4, the slides may instead be in the form of telescoping cylindrical bodies such as shown in perspective and separated from one another for clarity in FIG. 5. The slides respectively have transverse through openings 22 and 23 of the same shape and size as openings 15, 16, for example, of FIG. 4. Slide 21 telescopes within slide 20, and the latter is mounted for sliding movement in a guide passage (not shown) located in the mixing head for carrying out the invention as described in FIGS. 1, 2 and 4. One or both cylindrical slides 20, 21 are coupled to drives d for relative reciprocating movement along the common axis thereof, as shown by the double straight arrows in FIG. 5. Also, drives d for the cylindrical slides may have the capability of oscillating or vibrating one or both cylindrical slides about the common axis thereof, as shown by the curved double arrows of FIG. 5.

Slides in the form of telescoping cylindrical bodies 25 and 26 are shown in FIGS. 6a, 6b and 6c which are the same as openings extending through the slides are circular in cross-section to match the size and shape of bore 2 and of ejector rod 3 shown in FIG. 6a. Slide 26 is telescoped within slide 25, and the latter is located in a transverse guide passage 27 of circular cross-section provided in mixing head 1 in lieu of guide passages 7 and 7a of FIG. 1. Otherwise, the slides are located downstream of inlet nozzles 5, 6 and at the lower end of mixing chamber 4, similarly as in FIG. 1. Cylindrical slide 26 has a through transverse opening 31 of circular cross-section of the same size and shape as that of ejector rod 3. And, hollow cylindrical slide 25 has aligned through openings 32, 33 of the same size and shape as that of opening 31. The cylindrical bodies are respectively coupled to suitable drives d for relatively reciprocating and/or relatively oscillating one or both cylindrical slides respectively about along and/or the common axis thereof as described with reference to FIG. 5. FIGS. 6a and 6b show the position of the slides when stopped in a mixture ejecting position in which openings 31, 32, 33 are coaxial with bore 2 to permit ejector rod 3 to extend therethrough upon completion of the mixture preparation for ejecting the mixture out of the mixing head into the mold. Since the cylindrical bodies are free to move in two directions similar to that shown in FIG. 5, their transverse openings may be mismatched in one direction as shown in FIG. 6c in which they are relatively oscillated or vibrated about the common axis thereof. Or, the cylindrical bodies may be relatively reciprocated along their common axis for mismatching the transverse openings thereof (not shown) as in the same manner illustrated in FIGS. 1b and 2b.

The FIG. 7 embodiment is similar to that of FIG. 6 except that the central axis P of the telescoping cylindrical slides does not intersect with the axis of bore 2 but is rather slightly shifted relative thereto. Transverse passage 27 in the mixing head is thus shifted slightly relative to bore 2, as shown in FIG. 7a, solid cylindrical slide 35 is telescoped within hollow cylindrical slide 34, and the latter is mounted for reciprocating and/or vibrating movement in passage 27. Slide 34 has a pair of aligned through openings 36, 37, the common axis of which is spaced from central axis P. Similarly, cylindrical slide 35 has a through transverse bore 38 intersecting with the periphery of the slide and having an axis likewise spaced from axis P. Aligned openings 36, 37 and opening 38 are of the same size and shape as that of bore 2, and the radius $r_2$ of opening 38 is equal to one-half the diameter d of bore 2. Common axis P intersects the wall of bore 2, such that the cylindrical slides may be relatively rotated until openings 36, 37 and 38 are coaxial with bore 2 in a mixture ejecting position to permit ejector rod 3 to extend therethrough for ejecting the prepared mixture from the mixing head similarly as described with reference to the foregoing embodiments. And, one or both cylindrical bodies may be relatively reciprocated and/or relatively oscillated into various mixture preparation positions (one of which is shown in FIG. 7a) for regulating the predetermined mixing pressure required for the mixture.

Another embodiment of the invention is shown in FIG. 8 as comprising three telescoping cylindrical bodies 42, 43 and 44, the latter of which is located in cylindrical passage 27 for reciprocating and/or oscillating movements. The other two cylindrical bodies are likewise capable of being reciprocated and/or oscillated similarly as described above. Solid cylindrical body 44 has a through transverse opening 46, hollow cylindrical body 43 has aligned transverse openings 49, 50, and hollow cylindrical body 42 has aligned transverse openings 47, 48. The common axis of all three cylindrical bodies is indicated at S. The transverse openings in all three cylindrical bodies are of the same shape and size as that of bore 2 and ejector rod 3. With this arrangement, a wide variety of mismatching between the three through openings between the bodies is made possible in that all three slides may be relatively reciprocated and/or oscillated, or less than all three slides may be relatively reciprocated and/or oscillated or vibrated. A dynamic mixing pressure for the mixture is thus made possible which essentially prevents leakage of mixture from the mixing chamber during the mixture preparation.

This is schematically shown in FIG. 9 (line a). Based on the mass inertia of the mixture and the strongly dampened system according to the invention, the open cross-section defined by the mismatched openings of the moving slides has a cyclical effect (line b) similar to that of a time-constant flow resistor, which is dynamically created according to the invention.

In accordance with the several embodiments of the invention as aforedescribed, regulation of the pressure at which the mixture is prepared can be varied within wide limits to accommodate mixture components of different characteristics while assuring an improved mixing intensity with little pressure loss. And, it is possible to set the reciprocating, oscillatory and/or vibratory motions in such a manner that a calmed mixture discharge from the mixing head is assured.

In accordance with the invention, the mixing pressure may be set during mixture preparation by oscillating or vibrating the cylindrical slides such that the pressures obtained during mixing are determined by the frequencies and amplitudes of these oscillatory and vibratory movements. A dynamic flow resistance is thus produced during mixing which has a cyclically fixed presettable value. Thus, at least two slides having transverse through openings which function for the purpose and in the manner aforedescribed, are required in carrying out the invention.

A particular advantage which the invention offers, compared to that of the prior art, is that the optimum inletting mixing pressure is determined relative to the properties of the components of the mixture, for example, relative to the viscosity of the components and the quality of the molded parts to be produced, in that the frequencies and/or amplitudes of the slides may be altered, dephased relative to one another, or dephased oscillatory motions until the respective optimum inletting pressure of the mixture has been experimentally set. Also, the influence of temperature on the quality of the molded bodies may be examined in advance, particularly depending on the temperature of the mixing pressure, if all other parameters are constant, such as the mass flow of the components being fed to the mixing chamber.

The dynamic flow resistance can be regulated over a wide range so that mixing heads can be universally used in accordance with the invention. And, the through holes in the slides can be totally mismatched at the commencement of the mixing operation for closing the mixing chamber until a predetermined mixing pressure is obtained after which the openings of the slides are aligned with the mixing head bore permitting the ejector rod to eject the prepared mixture from the mixing head. Thus, an excellent start-up mixing process is assured as well as a rapid build-up of the mixing pressure.

The mixing pressure may be sensed by a suitable sensor such that the medium cross-section of the opening dynamically formed by the mismatched openings in the moving slides is altered depending upon the pressure such that the influence of temperature and variations of inflow of the components into the mixing chamber, are regulated.

The mixing head, at least in the area of the mixing chamber and/or the area of the slides, may consist of ceramic material. Titanium oxide may be employed as the ceramic material particularly for isocyanate-polyol mixtures which react into polyurethane. It has been shown that films of polyurethane, which may form during the oscillatory or vibratory motions can easily be removed as they have only a slight adhesion to titanium oxide.

What is claimed is:

1. A device for preparing a chemically reacting mixture, and for ejecting the mixture into a mold, the mixture comprising at least two components, in particular a mixture of isocyanate and a polyol that reacts completely to form polyurethane, the device comprising a mixing head having an outwardly open bore, a reciprocable ram coupled to said head, said ram having an ejector rod axially movable in said bore for ejecting the mixture therefrom when in an extended position, said rod defining with said bore a mixing chamber in a retracted position of said rod, said head having inlet passages for inletting the respective components into said chamber for preparing the mixture, said mixing head having guide passage means extending perpendicular to the axis of said bore and being positioned downstream of said rod from said retracted position thereof for delimiting said chamber, a pair of slides having through openings of a size equal to that of said bore, said slides being at least reciprocable in said guide passage means relative to one another between a mixture ejecting position and mixture preparation positions, means for at least reciprocating said slides at a predetermined frequency and/or amplitude and phase shift in accordance with a predetermined mixing pressure required for the mixture, said openings of said slides being coaxial with said bore in said mixture ejecting position to permit said rod to extend therethrough, and said openings of said slides in said mixture preparation positions being out of alignment with said bore for dynamically setting the mixing pressure required for the mixture.

2. The device according to claim 1, wherein said slides comprise telescoping cylindrical bodies having a common axis.

3. The device according to claim 2, wherein said cylindrical bodies are oscillatable relative to one another about said axis thereof, and said means further oscillating said bodies between said ejecting position and said preparation positions.

4. A device for preparing a chemically reacting mixture, and for ejecting the mixture into a mold, the mixture comprising at least two components, in particular a mixture of isocyanate and a polyol that reacts completely to form polyurethane, the device comprising a mixing head having an outwardly open bore, a reciprocable ram coupled to said head, said ram having an ejector rod axially movable in said bore for ejecting the mixture therefrom when in an extended position, said rod defining with said bore a mixing chamber in a retracted position of said rod, said head having inlet passages for inletting the respective components into said chamber for preparing the mixture, said mixing head having guide passage means extending perpendicular to the axis of said bore and being positioned downstream of said rod from said retracted position thereof for delimiting said chamber, a pair of cylindrical bodies having a common axis and having transverse openings of a size equal to that of said bore, said cylindrical bodies being oscillatable in said guide passage means relative to one another about said axis between a mixture ejecting position and mixture preparation positions, means for oscillating said cylindrical bodies at a predetermined frequency and/or amplitude and phase shift in accordance with a predetermined chamber pressure required for the mixture, said openings of said cylindrical bodies being coaxial with said bore in said mixture ejecting position to permit said rod to extend therethrough, and said openings of said cylindrical bodies in said mixture preparation positions being out of alignment with said bore for dynamically setting the mixing pressure required for the mixture.

5. The device according to claim 4, wherein the axes of said transverse openings intersect said common axis.

6. The device according to claim 4, wherein the axes of said transverse openings are spaced from said common axis.

7. The device according to claim 1, wherein a pressure sensor is provided at said chamber for sensing the predetermined pressure thereof.

8. The device according to claim 4, wherein a pressure sensor is provided at said chamber for sensing the predetermined pressure thereof.

9. The device according to claim 1, wherein said mixing head is of ceramic material at least at said bore and at said guide passage means.

10. The device according to claim 4, wherein said mixing head is of ceramic material at least at said bore and at said guide passage means.

* * * * *